3,393,699
OVER PRESSURE LIMITER

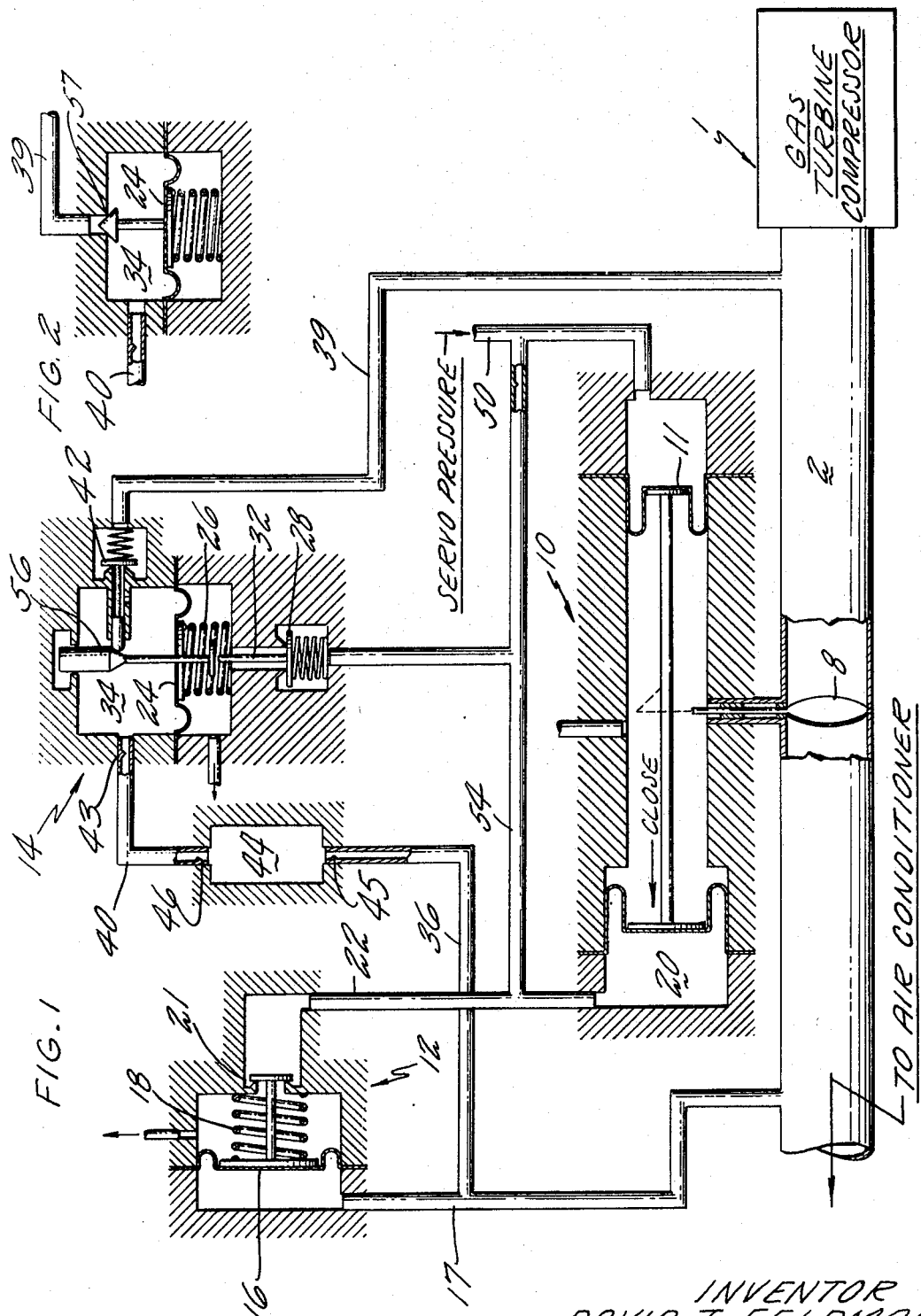

David T. Feldman, West Hartford, Conn., assignor to United Aircraft Corporation, East Hartford, Conn., a corporation of Delaware
Filed June 6, 1966, Ser. No. 555,531
3 Claims. (Cl. 137—489)

This invention relates to aircraft air-conditioning systems and particularly to pressure control valves for controlling the flow of air from a variable pressure source.

The use of a servo operated pressure regulating valve to control the pressure downstream of a pressure source is well known. A pressure sensing unit senses the downstream pressure and transmits a signal to the pressure regulator valve so as to adjust the position of the pressure regulating valve to maintain the downstream pressure at a relatively constant level. In the case of a failure of the sensing unit it is desirable to have means for maintaining the system in operation while still providing a signal to indicate that the primary sensing device is no longer operating. I have found that I can provide a backup system for the pressure regulating, or limiting, valve which will close the valve when the downstream pressure goes above a preset limit and which will not allow it to open until the upstream pressure goes below this limit.

In a system where the pressure source can be controlled, the closing of the valve can act as a warning or signal, and the system can be reactivated after the warning is received by reducing the pressure at the source to below the set value of the limiting valve, thus reactivating the system.

This system can be used to advantage in aircraft air-conditioning systems which operate off compressor bleed air from a gas turbine engine. By putting this valve between the compressor bleed and the air-conditioning system the pilot will be warned of a failure of the primary system by the loss of air-conditioning but may reactivate the system by throttling back and reducing engine speed so as to reduce the compressor bleed pressure.

It is an object of this invention to provide a control mechanism which will open a regulating valve when the downstream pressure exceeds a preset limit and which will close the valve when the upstream pressure goes below this preset limit.

This invention may be better understood by reference to the accompanying drawings in which:

FIGURE 1 is a schematic showing this invention embodied in a pressure limiting system for an aircraft air-conditioning system.

FIGURE 2 is a schematic for an alternate configuration of the overpressure limiting valve 14 shown in FIGURE 1.

Reference is now made to FIGURE 1. In this system high pressure bleed air from the compressor 1 of a gas turbine aircraft engine is supplied to an air-conditioning system, not shown, via duct 2. The compressor bleed air pressure may vary from approximately 30 p.s.i. to somewhat over 350 p.s.i. depending primarily on the design of the engine, the altitude and the speed of the aircraft. The bleed pressure decreases with increasing altitude and increases with increasing engine speed and aircraft speed so that the maximum pressure would be during high speed operation at low altitudes. In order to minimize weight the air-conditioning system is not designed to withstand high pressures for long periods of time and therefore a pressure limiting system is included in the system to control the pressure of the air going to the air-conditioning system.

The primary control system includes a butterfly valve 8 in the duct, a pneumatic half-area actuator 10 and a primary control valve 12. These mechanisms are well known in the art. Servo pressure from line 50 acts on the smaller end 11 of the half-area actuator 10 so as to urge it toward the closed position. Servo pressure is supplied to the chamber 20 on the large end of the half-area actuator via line 54. The primary control valve 12 bleeds air from the chamber 20 so as to control the position of the actuator and therefore the butterfly valve 8. Downstream pressure is transmitted to the left side of primary control valve diaphragm 16 via line 17. A regulator spring 18 acts on the other side of the diaphgram. A poppet valve 21 is attached to the diaphragm 16 so as to open line 22, and consequently chamber 20, to ambient when the diaphragm moves to the right. The valve 12 is designed so that the poppet valve 21 will remain closed until the downstream pressure exceeds approximately 135 p.s.i. As the pressure approaches 135 p.s.i. the differential pressure across the diaphragm 16 will overcome the spring 18 and cause the poppet valve 21 to open. As the valve opens air will be bled from line 22 causing the pressure in chamber 20 to decrease. This will upset the balance on the actuator 10 and it will move toward the closed position thereby tending to reduce the downstream pressure. As the downstream pressure decreases, because of the closing of the butterfly valve, the spring 18 will be able to overcome the pressure differential across the diaphragm 16, and poppet valve 21 will close. In this manner during normal operation the downstream pressure going to the air-conditioning system will be limited to 135 p.s.i.

If the diaphrgam 16 in the primary control valve breaks or is punctured during operation there will be no pressure drop across the diaphgram and the spring 18 will cause the diaphragm to move to the left closing valve 21. The primary control valve will be inoperative and unable to bleed, or relieve, the pressure in chamber 20. Assuming for the moment that there is no backup system the pressure in chamber 20 will increase and cause the actuator to open the butterfly valve 8 thereby subjecting the air-conditioning system to full compressor bleed air pressure.

The overpressure limiting valve 14 is designed to take over as a control in the event of a failure of the primary control valve 12 so as to prevent damage to the system due to overpressurization. The overpressure limiting valve 14 is in parallel to the primary control valve and is set at a higher pressure so as to be inoperative as long as the primary control valve is regulating the system. If the primary control valve fails, as described above, and the compressor bleed air pressure is high the downstream pressure will increase above 135 p.s.i.

A poppet valve 28 in the overpressure limiting valve is designed to bleed air from chamber 20 in the same manner as poppet valve 21. The top surface of the diaphrgam 24 is normally acted on by the downstream pressure which is transmitted via lines 17, 36 and 40. A regulating spring 26 acting on the bottom of the diaphragm prevents movement of the diaphragm in the downward direction when the pressure in chamber 34 is below 170 p.s.i. As the downstream pressure approaches 170 p.s.i. the pressure differential across the diaphragm will overcome the effect of the spring 26 and the diaphragm will move downward. A plunger connected to the diaphragm will contact the stem 32 on the poppet valve 28 causing the poppet valve to open. This will bleed the pressure from chamber 20 and cause the open butterfly valve to move toward the closed position. Without any additions to the system the overpressure limiter valve would now regulate at 170 p.s.i. in the same manner as the primary valve regulates at 135 p.s.i. The problem involved with this is that there would be no warning or signal to the occupants of the aircraft to inform them that the primary control valve was no longer functioning. This problem is alleviated by having a cam 56 attached to the diaphragm 24 so as to open poppet valve 42 when the diaphragm moves downward. This will cause the upstream pressure to be admitted to chamber 34 via line 39. Since the upstream pressure is always as high or higher than the downstream pressure the upstream pressure will therefore become the controlling pressure acting on diaphragm 24. Once the diaphragm begins to move down in response to the downstream pressure the poppet valve 42 will open and upstream pressure acting on diaphragm 24 will keep the diaphragm down and maintain the poppet valve 28 in the open position, thereby bleeding chamber 20. This will cause the butterfly valve to move to the closed position thereby reducing the downstream pressure. However, since the upstream pressure is now controlling the overpressure limiter valve the butterfly valve will remain in the closed position. In this manner the overpressure limiter valve will open when the downstream pressure exceeds a preset limit and will remain open until the upstream pressure goes below this same preset limit. The valve 8 will be closed while the poppet valve 42 is open, thereby blocking the flow of air in duct 2.

An orifice 43 in line 40 is used to restrict the flow from chamber 34 to line 17 when the valve 42 is open.

Two orifices 45 and 46 and a plenum chamber 44 have been added to the overpressure limiter valve circuit to reduce the possibility of a tripping of the overpressure limiter valve due to rapid changes of upstream pressure. These items provide a lag in the overpressure limiting system so as to prevent inadvertent operation of this system.

FIGURE 2 shows a modification of the overpressure limiter valve 14 shown in FIGURE 1. In this design a poppet valve 57 is directly connected to the diaphragm assembly 24 so as to connect the upstream pressure line 39 directly with the chamber 34 when the diaphragm piston assembly moves down. The need for a cam follower and spring loaded poppet valve as shown in FIGURE 1 is eliminated.

Thus, this invention is described by way of illustration rather than limitation and accordingly it is understood that this invention is to be limited only by the appended claims taken in view of the prior art.

I claim:
1. In a system in which compressor bleed air from an aircraft gas turbine is supplied, via a supply duct, to an air-conditioning system, a mechanism for limiting the pressure of air leaving the duct comprising:
 (1) a valve in the duct for controlling the flow therein;
 (2) primary control means responsive to downstream pressure in the duct for regulating said valve to limit the downstream pressure to a first maximum preset value; and
 (3) emergency control means responsive to downstream pressure for closing said valve when the downstream pressure exceeds a second preset value which is somewhat higher than the limiting pressure of said primary control means, said emergency control means maintaining said valve in the closed position until the upstream pressure in the duct goes below the second preset limit.

2. In a system in which compressor bleed air from an aircraft gas turbine is supplied, via a supply duct, to an air-conditioning system, a mechanism for limiting the pressure of air leaving the duct comprising:
 (1) a valve in the duct for controlling the flow therein;
 (2) an actuator for positioning said valve;
 (3) a source of actuating pressure tending to operate said actuator in a direction to open said valve;
 (4) a pressure limiting valve responsive to the downstream pressure in said duct for reducing said actuating pressure when the downstream pressure exceeds a preset limit; and
 (5) an emergency pressure limiting valve for reducing said actuating pressure when the downstream pressure in the duct exceeds a second preset limit, which is somewhat higher than said first preset limit, and for maintaining said actuating pressure at a low level until the upstream pressure in the duct goes below the second said preset limit.

3. The system as defined in claim 2 wherein said emergency pressure limiting valve comprises:
 (6) a chamber having a flexible diaphragm forming a wall thereof;
 (7) a spring acting against the outside of the flexible diaphragm;
 (8) means for communicating the downstream pressure in the duct to said chamber;
 (9) a poppet valve coupled to said diaphragm for bleeding said source of said actuating pressure to ambient when the pressure in said chamber is sufficient to overcome said spring and move the diaphragm; and
 (10) means coupled to said diaphragm for communicating the upstream pressure in the duct to said chamber when the diaphragm is moved enough to open said poppet valve.

References Cited
UNITED STATES PATENTS

| | | | |
|---|---|---|---|
| 2,812,774 | 11/1957 | Anderson et al. | 137—489 |
| 2,896,850 | 7/1959 | Ashley | 137—489 XR |
| 3,047,010 | 7/1962 | Rothfuss | 137—489 |
| 3,304,002 | 2/1967 | Grayson | 137—489 |

M. CARY NELSON, *Primary Examiner.*

ROBERT J. MILLER, *Assistant Examiner.*